Patented July 18, 1933

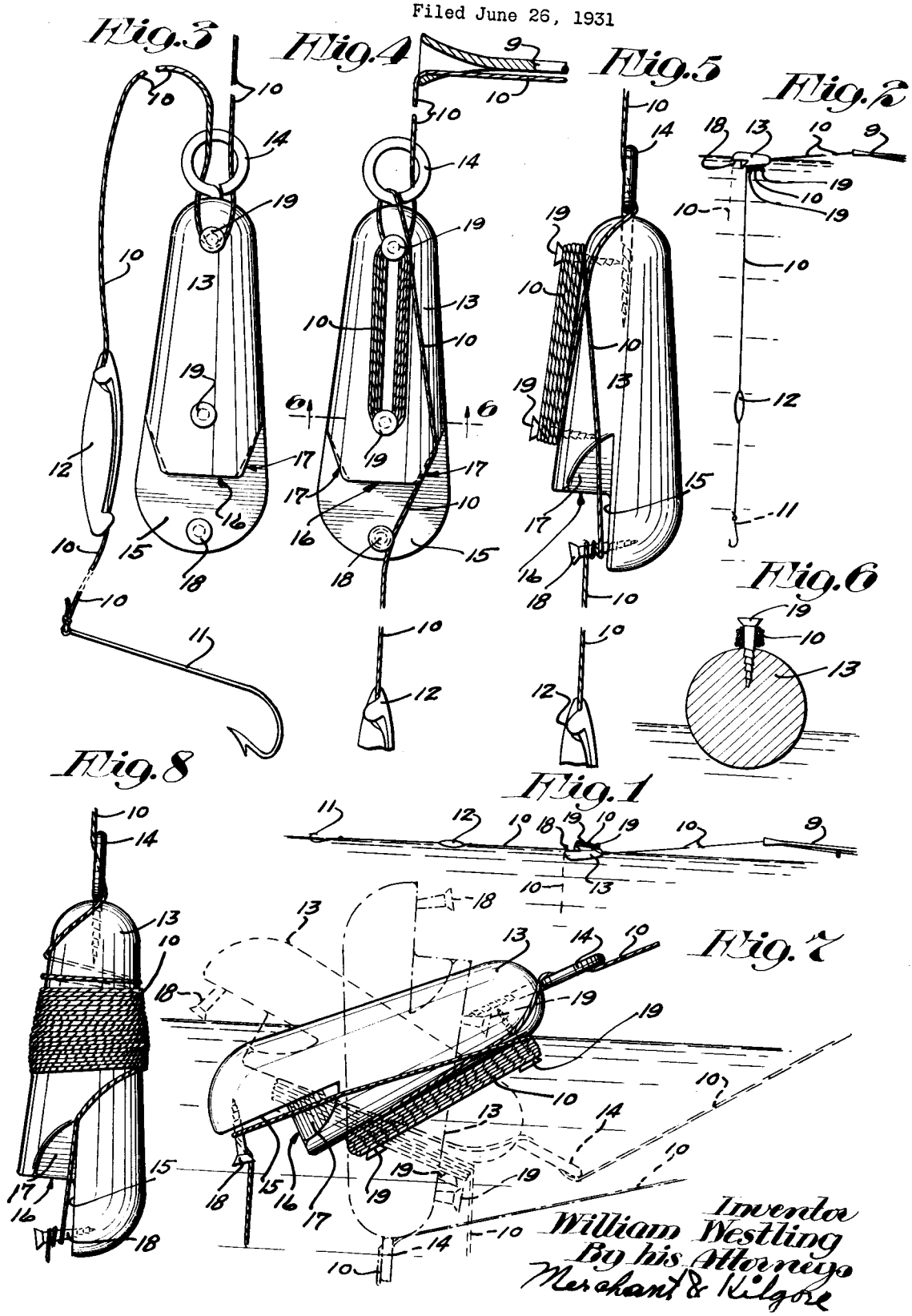

1,918,507

UNITED STATES PATENT OFFICE

WILLIAM WESTLING, OF MINNEAPOLIS, MINNESOTA

FLOAT FOR CASTING LINES

Application filed June 26, 1931. Serial No. 547,057.

My present invention relates to fishing tackle and has for its object to provide a bobber or float for a casting line.

As is well known when casting it is necessary to start drawing the line in, by means of a reel or otherwise, substantially when the hook and sinker strike the water to prevent the hook from settling on the bottom of the lake, river, or stream, or catching in weeds or on rocks. To secure the best results in fishing when casting it is desirable to allow the hook to remain in the water substantially stationary for a short time and thereafter intermittently move the hook by drawing on the line before starting to reel the same in.

To fish in this manner the improved float acts as an auxiliary reel on which a casting line between the float and the sinker may be reeled by winding or otherwise and from which auxiliary reel the gathered portion of the line is automatically unreeled and the hook held suspended thereby from the float to the desired depth in the water.

To the above end, generally stated, the invention consists of the novel construction and arrangement of parts hereinafter described and defined in the claims.

In the accompanying drawing, which illustrates the invention, like characters indicate like parts throughout the several views.

Referring to the drawing:

Fig. 1 is a fragmentary view of a casting pole and a hook and sinker-equipped line to which the improved float is attached and showing the same resting on a body of water as it drops at the completion of the casting thereof;

Fig. 2 is a view corresponding to Fig. 1 but showing the hook and sinker-equipped end of the line partly unreeled from the float;

Fig. 3 is an enlarged view of the float showing the method of attaching the same to the line;

Fig. 4 is a view corresponding to Fig. 3 but showing the line reeled on the float and ready for casting;

Fig. 5 is a side elevation of the parts shown in Fig. 4;

Fig. 6 is a view principally in transverse section taken on the line 6—6 of Fig. 4;

Fig. 7 is a view showing different positions of the float by means of full and broken lines during the releasing and the unreeling of the line; and Fig. 8 is a view corresponding to Fig. 5 but showing a slight modification of the float.

The numeral 9 indicates a casting fish pole, only the tip of which is shown, and the numeral 10 indicates a casting line having on its outer end a hook 11 and just inward of said hook a sinker 12. A reel for the line 10 will be attached to the pole 9 but, for the purpose of this case, it is not thought necessary to illustrate the same and said line will be guided on the pole 9 in the customary manner during the reeling and unreeling thereof.

The improved float 13, which acts as an auxiliary reel, may be made from wood or any other suitable material and is painted or otherwise covered to protect the same. Preferably this covering for the float 13 will be a bright color so that the float will act as a lure, as will presently appear.

The float 13 is of cylindrical form, tapered from one end to the other, and the ends thereof are rounded. Attached to the small end of the float 13 and projecting axially therefrom is a screw eye 14. The float 13, at its large end portion, is circumferentially notched to substantially the axis thereof and for 180° to form a flat surface 15 and a wall 16 that is perpendicular thereto. Said float 13, at the ends of its wall 16, is reversely beveled to form a pair of rearwardly diverging shoulders 17 that are undercut for a purpose that will presently appear, see Figs. 3 and 4. The screw eye 14 and the flat surface 15 are substantially in the same plane and at the axis of the float 13.

Secured to the float 13, on the flat surface 15 and close to the outer end thereof, is a headed pin 18 which is perpendicular to said surface. Also secured to the float 13, between its small end and the wall 16, is a pair of spaced headed pins 19 that form a cleat with undercut ends produced by the heads of said pins 19. The pins 18 and 19 are laterally spaced longitudinally of the float 13 and project radially outward therefrom in the same direction and in the same plane.

The float 13 is attached to the line 10, as shown in Fig. 3, and slipped therealong until the desired distance from the hook 11 or, in other words, until the float 13 is positioned to hold the hook 11 suspended in the water to the desired depth. Before casting the hook-equipped end portion of the line 10 is wound on the cleats or pins 19, as shown in Figs. 4 and 5, and thereafter the outer end portion thereof is placed against one of the undercut shoulders 17 and wound on the pin 18. This winding of the line 10 on the pin 18 prevents the line from unreeling from the cleat 19 while the fishing tackle is being handled and during casting of said line. During the casting of the line 10 the sinker 12 traveling in advance of the float 13 produces a pull thereon, due to its weight, that holds the line 10 taut and prevents the same from slipping over the head of the pin 18. At the time the line 10 reaches its outermost position during the casting thereof, said line 10, hook 11, sinker 12 and float 13 drop on the water as shown in Fig. 1. The weight of the sinker 12 immediately carries the hook 11 and the respective portion of the line 10 into the water so that it hangs from the pin 18. In case the pin 18 is in an upright position, as shown in Fig. 1, at the time the float 13 strikes the water, the weight of the sinker 12 acting on the float 13 through the pin 18 with a crank action will turn the float 13 about its longitudinal axis and position said float with the pin 18 projecting downward. In this position of the pin 18 its head will prevent the line 10 wound thereon from slipping thereover and cause the same to automatically unwind from the pin 18 under the pulling action produced on said line by the sinker 12, as shown by full lines in Fig. 7.

When the line 10 is released from the pin 18 it will be automatically unreeled from the cleat or pins 19 and during this unreeling of the line the heads on said pins will prevent the line 10 from slipping bodily therefrom. During the unreeling of the line 10 from the pins 19 it will be alternately released therefrom and as said line is drawn over the heads on the pins 19 the downward pull on the line 10 by the sinker 12 will pull the respective end of the float 13 into the water, and thereby cause the float 13 to set up a wiggling or luring action.

At the completion of the unreeling of the line 10 from the float 13 the pull on the line 10 produced by the sinker 12 on the eye 14 will tip the float 13 from its substantially horizontal position into an upright position, as shown by dots and dashes in Fig. 7. In this position of the float 13 the same will act as a bobber and hold the hook 11 to the desired depth in the water.

Referring now to the modification shown in Fig. 8, the parts thereof are the same as in the other figures with the exception that the pins 19 are dispensed with and said parts are given the same numerals followed by a prime. In this modification the line 10' is wound or reeled directly on the float 13'.

What I claim is:

1. A float having means at one end for attaching a casting line thereto, said line having a sinker attached to its outer end, said float having means for holding a portion of the line wound between its point of attachment to the float and the sinker, and means on the other end of the float for holding the line from unwinding during casting and for releasing the line and permitting the same to be unwound by the weight of the sinker after the float strikes the water.

2. A float having means at one end for attaching a casting line thereto, said line having a sinker attached to its outer end, said float having means for holding a portion of the line wound between its point of attachment to the float and the sinker, and a headed pin on the other end of the float on which the line may be coiled for holding the line from unwinding during casting.

3. A float having means at one end for attaching a casting line thereto, said line having a sinker attached to its outer end, said float having means for holding a portion of the line wound between its point of attachment to the float and the sinker, the float at its other end having a notch which extends from one side thereof to substantially the axis of the float, and a headed pin secured to the float and extending into the notch and on which pin the line may be coiled for holding the line from unwinding during casting.

4. A float having means at one end for attaching a casting line thereto, said line having a sinker attached to its outer end, said float having means spaced longitudinally thereof for holding a portion of the line wound between its attachment to the float and the sinker, and means on the other end of the float for holding the line from unwinding during casting and releasing the line and permitting the same to be unwound by the weight of the sinker after the float strikes the water.

5. A float having means at one end for attaching a casting line thereto, said line having a sinker attached to its outer end, pins projecting from the float at longitudinally spaced points for holding a portion of the line wound between its attachment to the float and the sinker, and means on the other end of the float for holding the line from unwinding during casting and for releasing the line and permitting the same to be unwound by the weight of the sinker after the float strikes the water.

WILLIAM WESTLING.